United States Patent Office 3,394,399
Patented July 23, 1968

3,394,399
MANNICH BASE SYNTHESIS OF
SUBSTITUTED PHENOLS
Francis J. Bajer, Depew, and Russell L. K. Carr, Grand
Island, N.Y., assignors to Hooker Chemical Corporation, Niagara Falls, N.Y., a corporation of New York
No Drawing. Filed Mar. 29, 1965, Ser. No. 443,661
13 Claims. (Cl. 260—621)

This invention relates to a new method for the preparation of substituted phenols. More particularly, it relates to a new method for the preparation of mono-substituted phenols and di-substituted phenols. Still more particularly, it relates to a new method of preparing 2,6-dimethylphenol and 2-methylphenol.

Substituted phenols have heretofore been prepared by a variety of methods which include the reaction of phenol with olefins, and the reaction of phenol with alcohols or ethers employing an activated catalyst. The substituted phenols produced by the process of this invention are known to the art and are useful as intermediates in the preparation of polymers exhibiting a relatively high degree of toughness and possessing excellent electrical properties.

An object of the present invention is to provide a method for the conversion of substituted alicyclic ketones to substituted phenols. Another object of this invention is to make dialkylphenols and monoalkylphenols. A further object of this invention is to make 2,6-dimethylphenol and 2-methylphenol. These and other objects will become apparent to those skilled in the art from the following detailed description of the invention.

In accordance with the practice of this invention, it has now been discovered that substituted cyclohexanones selected from the group consisting of compounds having the formulas:

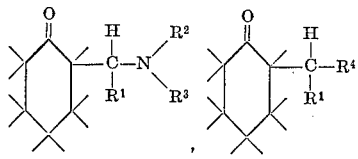

and

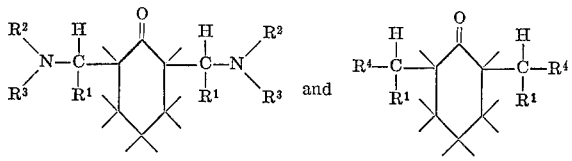

wherein $R^1$ is selected from the group consisting of hydrogen and lower alkyl having from 1 to 8 carbon atoms, the preferred having from 1 to 4 carbon atoms, the most preferred of these is methyl, $R^2$ and $R^3$ are independently selected from the group consisting of hydrogen, lower alkyl having from 1 to 8 carbon atoms, the most preferred of these having from 1 to 4 carbon atoms, and aralkyl having from 7 to 12 carbon atoms, the most preferred of these having from 7 to 9 carbon atoms, so that $R^2$ and $R^3$ may be the same or different, and $R^4$ is selected from the group consisting of piperidino and morpholino, can be effectively and directly converted to corresponding compounds having the formulas:

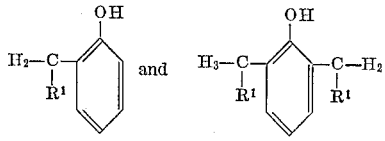

wherein $R^1$ is as described above, by a process which comprises pyrolyzing the substituted cyclohexanone in the presence of a platinum metal catalyst, and thereafter separating the product from the reaction mixture.

The process of this invention is one in which deamination, dehydrogenation and isomerization to an aromatic system occur. Since the exact mechanism is not presently known the foregoing description is intended for illustration and clarification only.

As the substituted cyclohexanones, in the process of this invention, it is preferred to employ the Mannich bases of cyclohexanone. The Mannich bases of this invention are those which are prepared by the reaction of a cyclic ketone, an aldehyde and an amine. For example, 2,6-bis-dimethylaminomethyl cyclohexanone dihydrochloride has been effectively prepared by the reaction of cyclohexanone, paraformaldehyde and dimethylamine hydrochloride. Illustrative of additional aldehydes which may be suitably used in preparing the Mannich base are formaldehyde, acetaldehyde, and the like.

Illustrative of additional amines which may be suitably used in preparing the Mannich base are primary and secondary amines such as methylamine, ethylamine, propylamine, dimethylamine, diethylamine, dipropylamine, piperidine, dibenzylamine, morpholine and the like. Of these, it has been found that dimethylamine is particularly useful with formaldehyde.

It is to be understood that the substituted cyclohexanone intermediates used in the process of this invention need not be restricted to those prepared utilizing the above-described Mannich reaction but may be obtained from any other source or process, such as the direct aminolysis of 2-haloalkyl cyclohexanones or 2,6-haloalkyl cyclohexanones.

Typical examples of the substituted cyclohexanones hereinbefore described are 2-(dimethylaminomethyl) cyclohexanone, 2,6 - bis - dimethylaminomethyl cyclohexanone, 2,6-bis(methylbenzylaminomethyl) cyclohexanone, 2-(methylbenzylaminomethyl) cyclohexanone and the like.

When the substituted cyclohexanone, as represented by the formula previously described, is an acid salt, it is preferred to neutralize the salt to produce free base. The neutralization can be carried out using at least a stoichiometric amount of a suitable base. Examples of such bases include compounds such as sodium hydroxide, potassium hydroxide and the like.

In the practice of the process of this invention the substituted cyclohexanone is contacted with a catalyst and pyrolyzed to produce the corresponding substituted phenol.

The catalyst employed in the practice of this invention is a platinum metal selected from the group consisting of platinum, palladium, rhodium, osmium, iridium and ruthenium. Of these, it has been found that palladium and platinum are particularly suitable. Advantageously, a support may be combined with the platinum metal using conventional methods. Typical examples of supports are carbon, alumina, pumice, kieselguhr and the like. The most preferred of these is carbon. Satisfactory results are obtained when a supported catalyst, such as palladium on carbon, is employed with the substituted cyclohexanone in a percentage in the range of 0.1 percent to 30 percent of free catalyst based on the weight of substituted cyclohexanone. The preferred percentage is in the range of 0.1 percent to 15 percent, and the most preferred is in the range of 0.1 percent to 10 percent on the basis previously mentioned.

The catalytic pyrolysis of the process of this invention may be carried out at temperatures in the range of 50 degrees centigrade to 300 degrees centigrade, it being more preferred to maintain a temperature in the range of 75 degrees centigrade to 250 degrees centigrade, with the most preferred range being from about 100 degrees centigrade to 225 degrees centigrade.

The reaction time is dependent upon a variety of factors, such as temperature, pressure, (if employed, concentration of reactant and catalyst, type of equipment employed and the like. It has been found that at atmospheric pressure a period of about 3 hours at a temperature above 100 degrees centigrade is usually sufficient to produce satisfactory yields of substituted phenol.

Advantageously, a slow stream of inert gas, such as nitrogen, may be passed over the reaction zone, so as to maintain an inert reaction atmosphere. Atmospheric pressure was employed in all the reactions; however, when pressures below or above atmospheric are used, satisfactory results are also obtained.

The reactant and catalyst may be brought into contact by any of several convenient means. For example, the substituted cyclohexanone and catalyst can be pyrolyzed together while being subjected to vigorous agitation. Additionally, it may be desirable to employ a convenient amount of a high boiling inert solvent, such as diphenylether, dimethylacetamide, paraffinic hydrocarbons and the like. Generally, however, the reaction is conducted in the absence of added solvent. Alternatively, the substituted cyclohexanone may be passed through a catalyst containing columnar reactor maintained at a suitable temperature, which temperature may be in the range of 50 degrees centigrade to 300 degrees centigrade. In the latter case, the reactants may be in the liquid phase or the vapor phase. Further means of contacting the reactant and catalyst may include a fluidized bed.

The separation of the products of the process of this invention may be accomplished by a variety of means, including, but not limited to steam distillation, distillation with normal or subnormal pressures, sublimation and/or extraction, and the like.

The following examples illustrate the process of the invention, however, they are not to be construed as limiting the invention except as defined in the appended claims. All temperatures are in degrees centigrade and all parts are by weight, unless otherwise mentioned.

Example I

This example illustrates the preparation of 2,6-bis (dimethylaminomethyl) cyclohexanone · (dihydrochloride).

To a flask, equipped with a reflux condenser, and containing 163 parts of dimethylamine hydrochloride dissolved in 420 parts of glacial acetic acid, were added 98 parts of cyclohexanone (freshly distilled) and 60 parts of paraformaldehyde. The mixture was heated over a steam bath causing it to suddenly and vigorously exotherm. When the exotherm subsided, the resulting clear solution was continually steam-heated for 2½ hours at about 96 degrees centigrade. Thereafter, the reaction mixture was cooled to room temperature. The glacial acid solvent was then gradually evaporated from the reaction mixture, using a Rinco evaporator and aspirator vacuum. The residual solid was then dispersed in 277 parts of acetone and the mixture refluxed for about ½ hour. The undissolved solids were suction filtered from the acetone wash. A second 277 parts acetone wash followed. The acetone insoluble solid, dried in a vacuum desiccator, was obtained in a 67 percent yield.

When 81.5 parts of dimethylamine hydrochloride are reacted with 98 parts of cyclohexanone and 30 parts of paraformaldehyde, employing the apparatus and process of Example I, the resulting product is 2-(dimethylaminomethyl) cyclohexanone·(monohydrochloride).

Example II

This example illustrates the preparation of 2,6-bis (dimethylaminomethyl) cyclohexanone.

To a flask containing 190 parts of 2,6-bis(dimethylaminomethyl) cyclohexanone·2HCl dissolved in 250 parts of water, was added a solution of 80 parts sodium hydroxide in 250 parts of water. The flask was cooled in an ice-bath to dissipate the heat of reaction. The non-homogeneous aqueous phase was subsequently extracted with an initial 142 parts of ether, followed by three 71 part ether extractions. The ether portions were combined and dried over anhydrous sodium sulfate. The dried ether solution of amine was then gravity filtered to remove it from the drying agent and the ether was flash distilled over a steam bath until the ether distillation became sluggish. A vacuum aspirator was applied to the residue for about 15 minutes. The residue, consisting of liquid amine, was obtained in 74 percent yield ($n_D^{25}$ 1.4711).

When equimolar quantities of 2 - (dimethylaminomethyl) cyclohexanone·HCl are used in place of the 2,6 - bis(dimethylaminomethyl) cyclohexanone·2HCl of Example II, 2 - bis(dimethylaminomethyl) cyclohexanone is obtained.

Example III

This example illustrates the process of this invention and the product obtained thereby.

In a flask, equipped with a high speed stirrer, along with a nitrogen gas inlet tube, thermometer and Friedericks condenser, 100 parts of 2,6 - bis(dimethylaminomethyl) cyclohexanone was mixed with sufficient palladium on carbon catalyst to introduce to the reaction 0.3 percent of free palladium based on the cyclohexanone. The flask was externally heated by means of a silicone-oil bath which was in turn heated over a hot plate, while a slow stream of nitrogen gas was passed over the system and while the mixture was vigorously stirred. The temperature of the bath was gradually increased over a 2 hour period to a maximum bath temperature of about 210–220 degrees centigrade and the reaction mixture was then allowed to cool to room temperature. After weighing, 100 parts of water were added to the original reaction flask without separation of the catalyst, and the 2,6-dimethylphenol was steam distilled until the steam-distilled was free of oily droplets. Ice cooling of the non-homogeneous distillate caused crystallization of 2,6-dimethylphenol. The solid was then suction-filtered from the aqueous phase and air dried. The yield of crude residue was 35.5 parts (62 percent yield) with a melting point in the range of 37–46 degrees centigrade. A sublimed sample had a melting point of 45–47 degrees centigrade.

When equimolar quantities of a compound such as 2,6 - bis(dibenzylaminomethyl) cyclohexanone, 2,6 - bis (methylbenzylaminomethyl) cyclohexanone, and the like, are used in place of the 2,6-bis(dimethylaminomethyl) cyclohexanone of Example III, the corresponding products are obtained.

When 100 parts of 2-(dimethylaminomethyl) cyclohexanone are reacted with sufficient palladium on carbon catalyst to introduce to the reaction 0.3 percent of free palladium based on the cyclohexanone, employing the apparatus and process of Example III, the resulting product is 2-methylphenol. And, when equimolar quantities of a compound such as 2-(dibenzylaminomethyl) cyclohexanone, 2-(diethylaminomethyl) cyclohexanone and the like are used in place of the 2-(dimethylaminomethyl) cyclohexanone, the corresponding products are obtained.

What is claimed is:

1. A process for the preparation of substituted phenols which comprises pyrolyzing at from 50 degrees centigrade to 300 degrees centigrade a substituted cyclohexanone selected from the group consisting of:

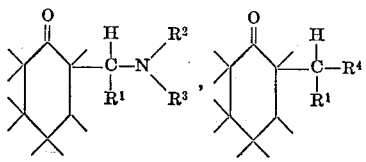

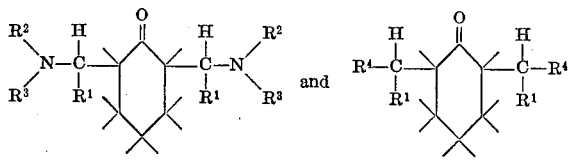

wherein $R^1$ is selected from the group consisting of hydrogen and lower alkyl having from 1 to 8 carbon atoms, $R^2$ and $R^3$ are independently selected from the group consisting of hydrogen, lower alkyl having from 1 to 8 carbon atoms, and aralkyl having from 7 to 12 carbon atoms, so that $R^2$ and $R^3$ may be the same or different, and $R^4$ is selected from the group consisting of piperidino and morpholino in the presence of a platinum metal catalyst, said pyrolyzing being sufficient to produce a reaction mixture which includes a product selected from the group consisting of:

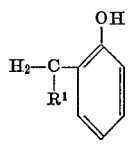

and

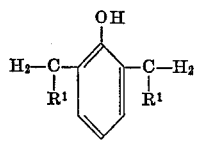

wherein $R^1$ is as defined above, and thereafter separating the product from the reaction mixture.

2. A process in accordance with claim 1 wherein the platinum metal catalyst is employed in a percentage in the range of about 0.5 percent to 30 percent of free catalyst based on the weight of substituted cyclohexanone.

3. A process in accordance with claim 2 wherein $R^1$ is hydrogen.

4. A process for the preparation of dialkylphenols which comprises pyrolyzing at from 50 degrees centigrade to 300 degrees centigrade a substituted cyclohexanone selected from the group consisting of

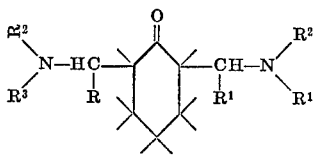

and

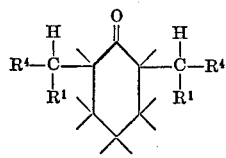

wherein $R^1$ is selected from the group consisting of hydrogen and lower alkyl having from 1 to 8 carbon atoms, $R^2$ and $R^3$ are independently selected from the group consisting of hydrogen, lower alkyl having from 1 to 8 carbon atoms, and aralkyl having from 7 to 12 carbon atoms, so that $R^2$ and $R^3$ may be the same or different, and $R^4$ is selected from the group consisting of piperidino and morpholino in the presence of a platinum metal catalyst, said pyrolyzing being sufficient to produce a reaction mixture which includes a product selected from the group consisting of:

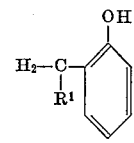

and

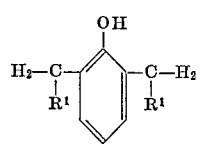

wherein $R^1$ is as defined above, and thereafter separating the product from the reaction mixture.

5. A process in accordance with claim 4 wherein the platinum metal catalyst is employed in a percentage in the range of about 0.5 percent to 30 percent of free catalyst based on the weight of substituted cyclohexanone.

6. A process in accordance with claim 5 wherein $R^1$ is hydrogen.

7. A process for the preparation of monoalkylphenols which comprise pyrolyzing at from 50 degrees centigrade to 300 degrees centigrade a substituted cyclohexanone selected from the group consisting of

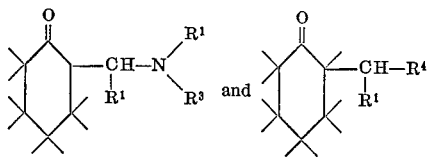

wherein $R^1$ is selected from the group consisting of hydrogen and lower alkyl having from 1 to 8 carbon atoms, wherein $R^2$ and $R^3$ are independently selected from the group consisting of hydrogen, lower alkyl having from 1 to 8 carbon atoms, and aralkyl having from 7 to 12 carbon atoms, so that $R^2$ and $R^3$ may be the same or different, and $R^4$ is selected from the group consisting of piperidino and morpholino in the presence of a platinum metal catalyst, said pyrolyzing being sufficient to produce a reaction mixture which includes a product selected from the group consisting of:

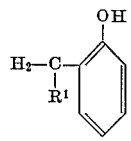

and

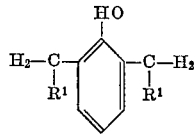

wherein $R^1$ is as defined above, and thereafter separating the product from the reaction mixture.

8. A process in accordance with claim 7 wherein the platinum metal catalyst is employed in a percentage in the range of about 0.5 percent to 30 percent of free catalyst based on the weight of substituted cyclohexanone.

9. A process in accordance with claim 8 wherein $R^1$ is hydrogen.

10. A process for the preparation of 2,6-dimethylphenol which comprises pyrolyzing 2,6-bis(dimethylaminomethyl) cyclohexanone in the presence of a platinum metal catalyst, in a temperature range of 50 degrees centigrade to 300 degrees centigrade, and thereafter separating the product from the reaction mixture.

11. A process for the preparation of 2,6-dimethylphenol which comprises pyrolyzing 2,6-bis(dimethylaminomethyl)cyclohexanone in the presence of a platinum metal catalyst, in a temperature range of about 75 degrees centigrade to 250 degrees centigrade, and thereafter separating the product from the reaction mixture.

12. A process in accordance with claim 11 wherein the platinum metal catalyst is employed in a percentage in the range of about 0.5 percent to 30 percent of free catalyst based on the weight of 2,6-bis-dimethylaminomethyl) cyclohexanone.

13. A process for the preparation of 2,6-dimethylphenol which comprises pyrolyzing 2,6-bis(dimethylaminomethyl) cyclohexanone at a temperature in the range of about 100 degrees centigrade to 225 degrees centigrade, in the presence of 0.1 percent to 10 percent of a platinum metal catalyst, and thereafter separating the 2,6-dimethylphenol from the reaction mixture.

References Cited

UNITED STATES PATENTS

| | | | |
|---|---|---|---|
| 2,321,551 | 6/1942 | Loder | 260—621 |
| 2,503,641 | 4/1950 | Taylor et al. | 260—621 |
| 2,882,319 | 4/1959 | Hotelling et al. | 260—621 X |

BERNARD HEFLIN, *Primary Examiner.*

H. ROBERTS, *Assistant Examiner.*